United States Patent [19]
Grauer

[11] 3,728,468
[45] Apr. 17, 1973

[54] SPRING TYPE GROUNDING MEANS FOR ELECTRICAL FIXTURES

[76] Inventor: Christopher B. Grauer, 3755 Northview Drive, Jackson, Miss. 39206

[22] Filed: Feb. 16, 1972

[21] Appl. No.: 226,690

[52] U.S. Cl....................................174/51, 339/14 R
[51] Int. Cl. ..............................................H01r 3/06
[58] Field of Search...................................174/51, 53; 339/14 R, 14 L, 122 R, 132 R, 132 B, 133 R, 134

[56] References Cited

UNITED STATES PATENTS

| | | | |
|---|---|---|---|
| 2,934,590 | 4/1960 | Thompson et al.......................174/53 |
| 3,432,793 | 3/1969 | Muska et al. .........................339/14 R |
| 3,663,919 | 5/1972 | Jaconette...............................339/14 R |
| 3,671,916 | 6/1972 | Opalenik ...............................339/14 R |

FOREIGN PATENTS OR APPLICATIONS 1,515,601  8/1969  Germany.........................339/122 R

*Primary Examiner*—Laramie E. Askin
*Attorney*—Thomas B. Van Poole et al.

[57] ABSTRACT

A spring clip contact member is disclosed in the form of a unitary V-shaped member formed of a pair of arms connected at an apex with rounded eyelet contact terminals being formed in the ends of the arms opposite the apex. The V-shaped member is mounted on the mounting screw between the yoke of an electrical receptacle and the receptacle mounting box to be spring biased outwardly into forcible contact with both the receptacle and the box for providing a grounding circuit between the receptacle and the grounding circuit of the box in one embodiment with a second embodiment being disclosed in which the end of one of the arms is welded to the receptacle yoke. In another embodiment, the spring contact member is formed with a rounded loop defining the apex of the V-shaped member.

7 Claims, 4 Drawing Figures

SPRING TYPE GROUNDING MEANS FOR ELECTRICAL FIXTURES

BACKGROUND AND OBJECTS OF THE INVENTION

This invention is in the field of electrical circuit establishing connections and is more specifically directed to the field of grounding circuit connections of the type employed for establishing an electrical circuit between an outlet box and an ordinary electrical component such as a female type electrical receptacle or a switch mounted in the box by means of screws extending through yokes on the component into mounting apertures in the box.

The National Electrical Code requires that grounding continuity must be established between a grounded outlet box and a grounding circuit of an electrical receptacle by means of a bonding jumper between the outlet box and the receptacle grounding terminal. However, the Code also provides that as an alternative to a bonding jumper, contact devices or yokes may be used in conjunction with the supporting screws of the receptacle to establish a grounding circuit between the yoke and the outlet box of the type normally installed in a wall. Such grounding circuits are required in order to provide a grounding path to protect the user of any electrical equipment which might short circuit so as to divert any shorted current to ground to avoid injury to the user.

The grounding connection between a conventional receptacle and mounting or outlet box is usually in the form of a third wire normally referred to as a bonding jumper extending between the receptacle and the metal box. Such a bonding jumper circuit construction functions satisfactorily; however, the connection of such a jumper requires time and labor and it is therefore desirable to eliminate the need for such by the provision of automatically connected grounding circuit establishing means which would be mounted in operative connection between the receptable and the box upon the mounting of the receptacle in the box. This invention provides such a construction.

Therefore, it is the primary object of this invention to provide a new and improved grounding circuit establishing means for providing a grounding circuit between a receptacle or other yoke-mounted component and a circuit box in which the receptacle or other component is mounted.

It is a further object of this invention to provide a new and improved grounding circuit establishing means which is inexpensive to fabricate and install.

A still further object of this invention is the provision of a grounding circuit establishing means which will be constantly urged into electrical contact between a receptacle or other yoke-mounted component and a mounting box.

Attainment of the objects of this invention is enabled through the provision of a spring clip type contact member in the form of a V-shaped member comprising two arm portions joined at an apex. In the preferred embodiment, each end of the arms opposite the ends joined at the apex is provided with a rounded eyelet which encircles the mounting screw extending through the yoke of the receptacle into threaded engagement with the mounting box. Movement of the mounting box inwardly into permanent position by tightening of the screws serves to compress the V-shaped contact member to provide a firmly established circuit between the receptacle yoke and the mounting box.

In another embodiment, the contact member has one end welded to the yoke of a component with the other end being provided with an eyelet for encircling the mounting screw adjacent the mounting box.

A better understanding of the subject invention will be obtained when the following written description is read in conjunction with the appended drawings in which.

DETAILED DESCRIPTION OF PREFERRED EMBODIMENTS

Figure 1:
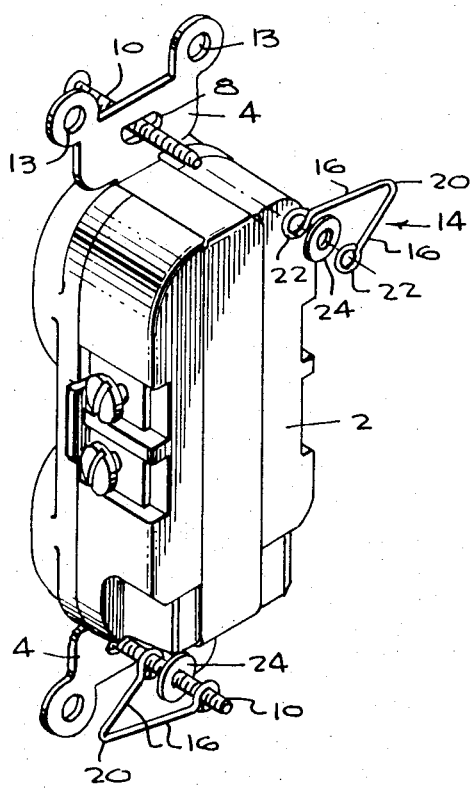
FIG. 1 is a perspective view of a receptacle type electrical component employing the preferred embodiment of the subject invention.
Figure 2:
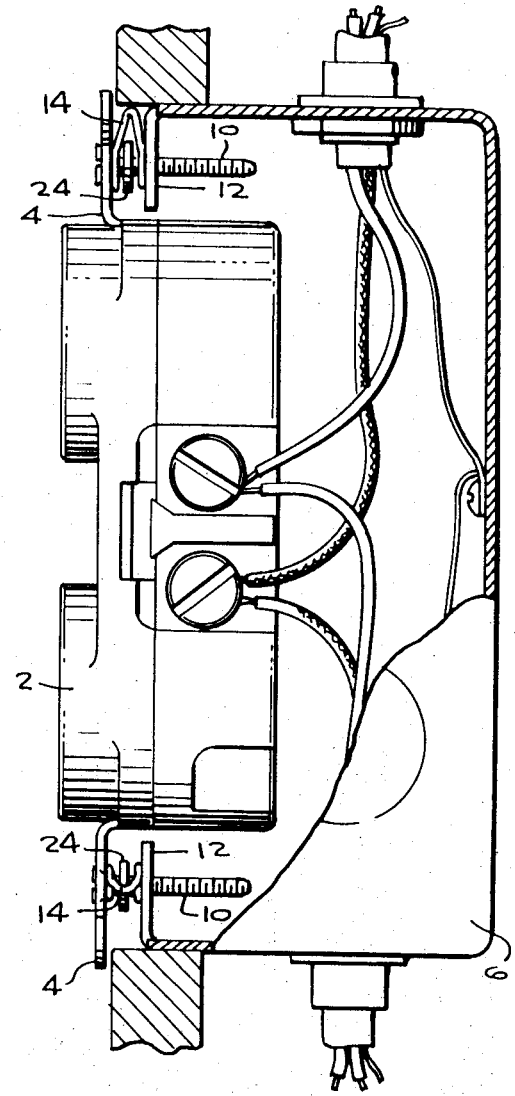
FIG. 2 is a sectional view of a receptacle connected to a wall mounted outlet box employing the preferred embodiment.

Attention is initially invited to FIG. 1 of the drawings which illustrates a conventional electrical component in the form of a female type electrical receptacle 2 of the type having yoke members 4 on each end for enabling attachment of the receptacle to a supporting outlet box 6 of the type shown in FIG. 2. It should be understood that the receptacle 2 can also be a switch or other similar yoke-mounted electrical component.

Each of the yoke members of the receptacle 2 is provided with a centrally oriented slot 8 through which a mounting screw 10 extends. Auxiliary mounting holes 13 are also provided in the yoke members. Mounting screws 10 are received in apertures in flanges 12 of the outlet box 6 as shown in FIG. 2. A positive electrical contact is provided between the yoke members 4 and the flanges 12 of the outlet box by means of a spring contact member 14 as shown in FIGS. 1 and 2.

Spring contact member 14 is formed of electrically conductive spring metal and comprises first and second arms 16 joined at an apex 20. Contact terminals in the form of eyelet portions 22 are provided on the ends of the arms 16 as shown in FIG. 1. Eyelet portions 22 are dimensioned to be matingly fitted over the outer periphery of the mounting screw members 10 and a fiber washer 24 is dimensioned to be snugly fitted over the periphery of the screw 10 for retaining the contact member 14 in position on a screw 10 extending through the yoke 4 prior to attachment of the yoke etc. to a mounting box 6. Such a fiber washer member is shown in position on the lowermost screw 10 in conjunction with the spring contact member on the lowermost screw 10.

Mounting of the receptacle 2 in the outlet box 6 is easily enabled by merely positioning the screw members 10 in the respective apertures in the flanges 12 and subsequently rotating the screws to move them inwardly to the position illustrated in FIG. 2. Such inward movement of the screws 10 also serves to compress the spring contact member 14 so that the spring contact member is biased outwardly with the eyelet portions forming a contact with the flange 12 and the yoke 4 under the constant bias of the compression of the contact member. Consequently, a positive electrical circuit is provided between the yoke 4 and the box 6 for grounding the receptacle 2 in a reliable manner.

Figure 3:
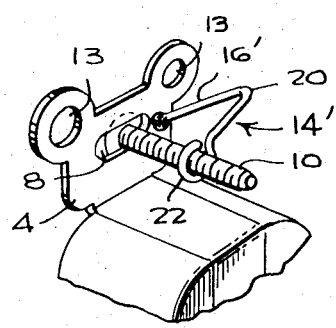
FIG. 3 is a perspective view of a second embodiment of the subject invention associated with an electrical component in the form of a receptacle.

FIG. 3 illustrates a second embodiment of the invention which is designated 14' and in which the spring contact member has only a single eyelet 22 matingly extending around the metal mounting screw 10. An arm 16' does not have any eyelet on its outermost end but is merely welded on its outermost end to the yoke member 4. Consequently, the embodiment illustrated in FIG. 3 does not require the employment of a fiber washer 24 for retaining the contact member in position prior to the mounting of the receptacle on the outlet box. It should be noted that the construction illustrated in FIG. 3 could also be welded to the outlet box at a point adjacent the aperture in the flange 12 for accomplishing the same purpose.

Figure 4:
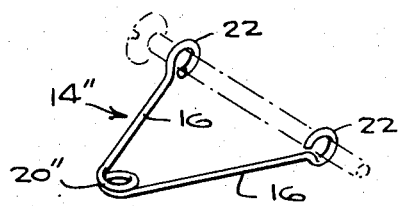
FIG. 4 is a perspective view of a third embodiment of the subject invention.

FIG. 4 illustrates a third embodiment of the subject invention which is designated 14". This embodiment is identical to the embodiment of FIG. 1 with the exception that the apex of the spring contact member 14" is in the form of a single coil loop 20". Otherwise, the spring contact member illustrated in FIG. 4 is identical to the contact members illustrated in FIG. 1.

While many modifications of the subject invention will undoubtedly occur to those of skill in the art, it should be understood that the spirit and scope of the subject invention is to be limited solely by the appended claims.

What is claimed is:

1. Connection means for establishing grounding continuity between the yoke of an electrical component and the grounding circuit of an outlet box mounting the electrical component, said connection means comprising a V-shaped compressible spring contact member defined by two arms joined at an apex having first and second contact terminals mounted on the ends of said arms opposite said apex, one of said contact terminals engaging a portion of the grounding circuit of an outlet box and the other of said contact terminals being a rounded eyelet for encircling a mounting screw extending between said yoke and said box and engaging the yoke of a component for establishing a circuit between the yoke and the grounding circuit wherein said spring contact member is compressed by the mounting of the component in the box to provide a constant force holding said contact terminals in forcible engagement with the yoke and the grounding circuit.

2. The invention of claim 1 wherein said spring contact member is of unitary spring metal construction and said apex is a single coil loop connecting said arms.

3. The invention of claim 1 wherein the contact terminal of one of said arms is fixedly welded to said yoke.

4. Connection means for establishing grounding continuity between the yoke of an electrical component and the grounding circuit of an outlet box mounting the electrical component, said connection means comprising a V-shaped compressible spring contact member defined by two arms joined at an apex having first and second contact terminals mounted on the ends of said arms opposite said apex, one of said contact terminals comprising a rounded eyelet member sized to matingly fit over a mounting screw extending from said yoke member to said outlet box and the other of said contact terminals also comprising a rounded eyelet member sized to matingly fit over the same mounting screw extending from said yoke member to said outlet box for establishing a circuit between the yoke and the grounding circuit of the outlet box wherein said spring contact member is compressed by the mounting of the component in the box to provide a constant force holding said rounded eyelet contact terminals in forcible engagement with the yoke and the grounding circuit.

5. The invention of claim 4 wherein said spring contact member is of unitary metal construction.

6. The invention of claim 5 additionally including a fiber washer snugly fitted over said mounting screws between said eyelets on one of said mounting screws for holding said connection means in place prior to attachment of said component to said outlet box.

7. The invention of claim 6 wherein said spring contact member is formed with said apex comprising a single coil loop connecting said arms.

* * * * *